May 12, 1970      R. C. WYNN      3,511,626
PROCESS FOR THE PREVENTION OF ADHERED GLASS
Filed Aug. 2, 1967
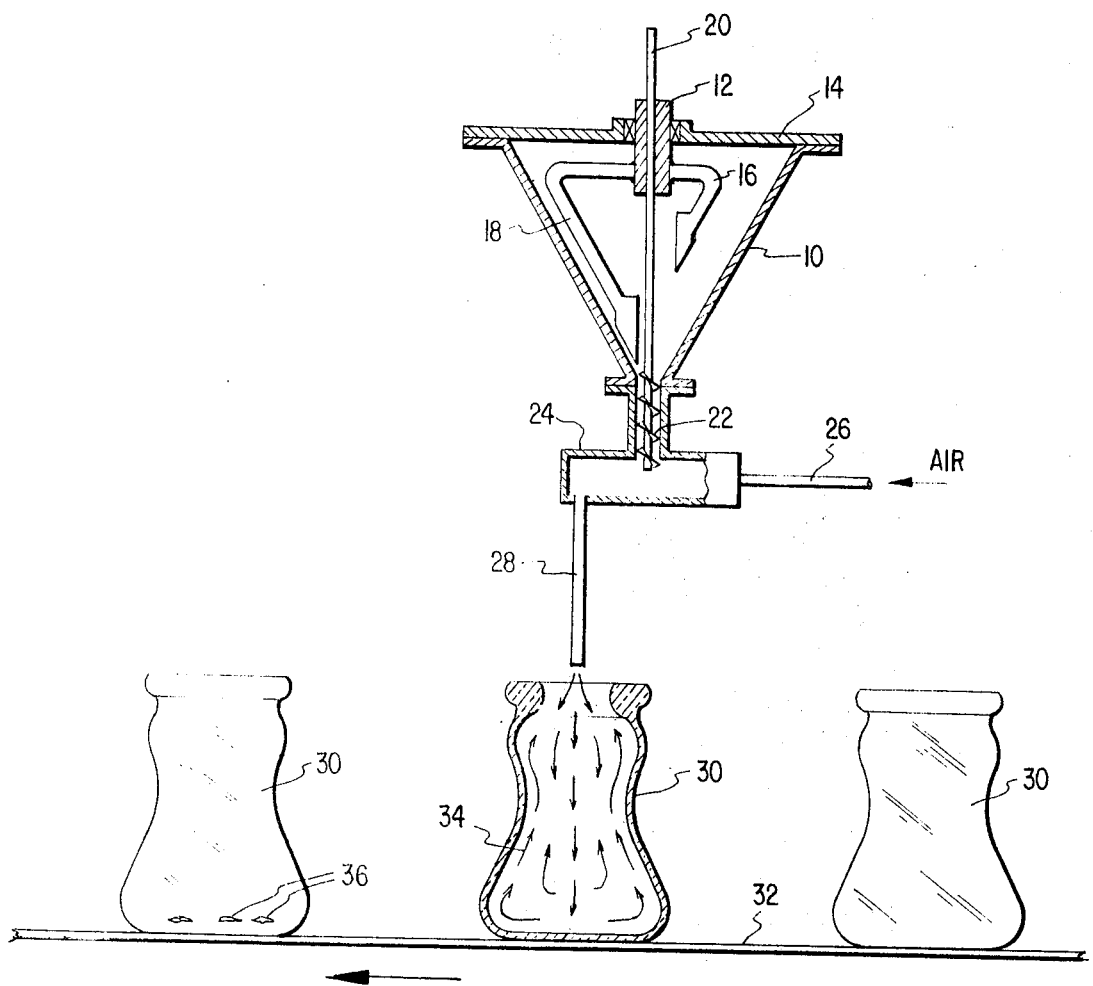
INVENTOR
ROBERT C. WYNN
BY
ATTORNEYS.

United States Patent Office 3,511,626
Patented May 12, 1970

3,511,626
PROCESS FOR THE PREVENTION OF ADHERED GLASS
Robert C. Wynn, Corning, N.Y., assignor to Corning Glass Works, Corning, N.Y., a corporation of New York
Filed Aug. 2, 1967, Ser. No. 657,991
Int. Cl. C03b 21/00
U.S. Cl. 65—24                                1 Claim

ABSTRACT OF THE DISCLOSURE

A mixture of alumina powder and air under pressure is directed at a hot glass body to substantially surround the hot glass body with a cloud of alumina powder. Any excess glass fragments are then trimmed from the hot glass body, while in the cloud of alumina powder, so that the alumina powder will coat the surface of the hot glass body as well as the hot glass fragments trimmed from the hot glass body, as they pass through the cloud of alumina powder prior to falling on the hot glass body.

BACKGROUND OF THE INVENTION

For many years the glass industry has been beset with a problem generally known as "adhered glass." This problem is of such a magnitude as to prevent the manufacture of some contemplated items and to seriously limit the production of others. At best, it has been calculated to have a minimal effect on at least 2% of any product produced.

Adhered glass is the result of a process which produces glass fragments coupled with a process which will induce sufficient heat so as to fuse these fragments to the parent body. This fusion may occur either internally or externally and the source of the heat may be the fragments themselves, the parent body or from a foreign application. Mechanical units, such as the turret chain, hub and ribbon machines, are heavy contributors to this fragmentization-fusion process.

The underlying principle of the fragmentization-fusion (adhered glass) process appears to be surface contact between the resulting glass fragments and the parent body while heat sufficient to cause fusion is generated between these surfaces. Therefore, in order to eliminate adhered glass, it becomes necessary to either eliminate all surface contact or to neutralize that surface contact which does occur. Of these two approaches, the one resulting in elimination of all surface contact appears to be the most likely to succeed. This can be accomplished:

(a) by removing all glass fragments as they are generated and before they have occasion to come into contact with any surface of the parent body, or
(b) by application of a non-reactive buffer coating to all the surfaces of the parent body to be protected and/or to all the glass fragments as they are generated, or
(c) by rapidly cooling and subsequently maintaining all surfaces at a temperature below the fusion point of the glass.

For most situation, it would appear that Item (b) has the best chance for continued success. The reason for this is that a non-reactive buffer can be readily applied prior to the occurrence of fragmentization and it can be left on until such time as it has either dissipated or until the glass has cooled to a temperature where it becomes feasible to remove the buffer and the glass fragment from the parent body. Selection of the proper buffer will generally depend on such variables as the ware temperature at time of application and the chemical composition of the glass being manufactured, as well as the conventional determinants such as ease of application, ease of removal, economy, etc.

In the past, if the resulting particles or fragments struck the hot parent body, the hot parent body was damaged by causing a bruise or check to occur or the particles fused with the parent body. Each of these incidents usually resulted in a loss of product. Prior to this invention much ware was lost in the annealing cycle as a result of the bruised, stressed and fused glass ware. That ware which successfully passed through the annealing cycle then had to be inspected and all the loose or partially fused glass fragments removed. All damaged ware and ware with adhering glass would be rejected.

Removal of the loose fragments was accomplished by wiping or sandpapering the ware by hand, by holding the ware over a mechanically rotated brush or by using a combination forced air and vacuum system. Care had to be exercised in the use of each of these methods so that the glass surface would not become marred or scratched. It was also important that all the fragments be removed since their presence was a constant source for injury to employees as well as a potential source for damage to such production equipment as silk screening machines.

The present invention consists of the preparation of a hot parent body of glass to resist the bruising, stressing and fusing effects of glass fragments by treating the parent body with a coating of alumina having a particle size between one micron and one hundred and fifty microns.

The present invention provides the glass industry with a method of eliminating glass-to-glass fusion at normal production speeds and temperatures. The present invention also eliminates bruises which often occur when glass is permitted to strike glass prior to annealing.

Furthermore, the present invention eliminates glass breakage during the annealing cycle when caused by stresses of fused glass to glass. Also, the present invention completely nullifies the adverse effects of any glass particle during subsequent cooling and heating cycles occasioned by normal production requirements. The present invention reduces the possibility of glass fragments causing injury to workers and/or production machines and subsequent production operations.

The method of the present invention also gives assurance that there is less likelihood of glass fragments being passed to the consumer in the products of the manufacturer, which might result in an injury.

SUMMARY OF THE INVENTION

A process for preventing the adherence of hot glass fragments to a hot parent body when excess glass is removed from a recently formed parent body comprising introducing alumina powder into a pressurized air jet and directing said air jet on to said hot parent body prior to trimming operations.

Other features of the invention will be pointed out in the following description and claims and illustrated in the accompanying drawing, which discloses by way of example, the principles of the invention and the best mode which has been contemplated of applying those principles.

IN THE DRAWINGS

The sole figure comprising the drawings is a side elevational view, partly in section, of the apparatus for carrying out the process of the present invention.

The purpose of the apparatus shown in the drawing is to lightly coat the surfaces of the hot parent body with a substance which will act both as a cooling and parting agent or buffer, to provide excess of this agent in the bottom or more critical areas of the ware and to provide a surrounding atmosphere of this same substance. The theory being that the glass fragments will become coated as they fall through the treated atmosphere and thereafter rendered harmless due to the presence of the excess buffer and cooling agent. The fragments can then be easily rejected with the excess reagent at a time consistent with production requirements.

In the drawing a suitable hopper 10 is provided for holding the supply of alumina powder. A hollow cylindrical shaft 12 is journaled in the upper surface 14 of the hopper 10 and a pair of angular mixing arms 16 and 18 are secured thereto. The shaft 12 may be rotated in one direction by an suitable means such as a motor or the like (not shown) to thereby rotate the arms 16 and 18 within the hopper to prevent the alumina powder from becoming caked or compacted. An elongated shaft 20 extends downwardly to the hollow cylindrical shaft member 12 and is journaled therein for rotation in the opposite direction. The shaft 20 may be rotated by any suitable means such as a motor or the like (not shown) and the lower end of the shaft 20 is provided with a helical flange 22 for feeding the alumina powder from the hopper 10 into the hollow cylinder 24. One end of the cylinder 24 may be connected to a pipe or hose 26 which in turn is connected to a suitable source of air under pressure. An outlet pipe 28 is secured adjacent the opposite end of the cylinder 24 and is directed downwardly in the direction of the glass ware 30 which is being transported past the end of the tube 28 on a conveyor 32.

In the operation of the device the hopper 10 is filled with a supply of alumina powder and the mixing arms 16 and 18 are rotated to agitate the supply of powder. A supply of air under pressure is admitted to the cylinder 24 at one end through the pipe 26 and the shaft 20 with the helical flange 22 injects a predetermined amount of alumina powder into the cylinder 24 intermediate the ends thereof. The resultant mixture of air and powder exits through the pipe 28 as an aerosol-type spray which is directed downwardly into and around the glass ware as it passes underneath the pipe 28. The trimming operation may take place in the vicinity of the outlet pipe 28 by any suitable means which are not shown in the present application since such trimming means do not form a part of the present invention. Thus it is seen that the surfaces of the glass ware will become coated with an alumina powder and the atmosphere surrounding the glass ware during the trimming operation will contain a substantial amount of alumina powder such that any falling particles or fragments will also become coated with the alumina powder. The arrows 34 within the glass ware article under the outlet conduit 28 indicate the flow of the particles within the article and it is obvious that a thicker coating of the alumina will be supplied to the bottom of the glass ware article. This is desirable since any particles or fragments of glass will ultimately fall into this bottom surface as the result of a trimming operation. Such particles of glass are shown schematically at 36 in the extreme left-hand article of glass ware 30.

The alumina can be readily applied in powder form as an aerosol spray at normal production speeds and temperatures due to its high melting point and its resistance to sintering. The aerosol spray can easily be applied in glass-forming temperatures as high as 1000° C. with no apparent harmful effects to the glassy surfaces. Alumina has the power to wet the hot glass and to resist chemical reaction at these elevated temperatures. This wetting power enables the alumina both to cool the hot glass and to act as a buffer. Thus all glass particles are prevented from directly striking and clinging to the hot parent body with the result being that bruising, checking and fusing are eliminated. Since the glass particles can no longer cling or adhere, they may be readily dumped or vacuumed from the ware so as to eliminate any further harmful effects on the employees and equipment.

Another possible method of application of the alumina is as a slurry using water or some other liquid as a carrier. Experience in this area indicates that the required volume ratio of carrier to alumina is so great that the benefits gained from the use of the alumina are more than offset by the harmful effects produced by the carrier such as thermal shock and checks, deformed ware due to premature cooling and carrier stain.

Still another method of application is to dump a quantity of the alumina powder onto a surface which is to be treated and then to agitate the powder with a blast of air. This method creates a tremendous dusting problem as well as having a tendency to embed the almina into the soft glass.

The best method, however, of alumina application was found to be the aerosol spray method described above with respect to the drawing and it was found that the temperature of the glass was generally unimportant as long as the pressure of application was controlled. It was also established that an alumina powder having a particle size in the range of one to one hundred microns was ideal to wet the glass without having a heavy carry-over and a subsequent dusting problem. The size of alumina particle could be as large as one hundred and fifty microns but it was found that a particle greater than this size is detrimental in that it can abrade or embed within the surface of the soft glass and consequently destroy its durability to resist staining or checking. A particle smaller than one micron becomes too difficult to control and leads to a serious dusting problem.

Prior to this invention, much ware was lost in the annealing cycle as a result of the bruised, stressed and fused glass to glass of "adhered glass" particles. This invention eliminates these losses by affording a buffer zone between the parent body and the generated glass fragments.

Prior to this invention, removal of the loose glass fragments was accomplished by wiping or sandpapering the ware by hand, by holding the ware over a mechanically rotated brush or by using a combination forced air and vacuum system. With this invention, these cleaning methods are no longer required. It is only necessary to simply turn the ware up-side-down and the glass fragments will fall away from the ware by gravitational action.

Obviously many modifications and variations of the present invention are possible in the light of the above teachings. It is therefore to be understood that within the scope of the appended claim, the invention may be practiced otherwise than as specifically described.

What is claimed is:

1. A process for preventing the adherence of hot glass fragments to a hot glass parent body when said fragments are trimmed from said hot glass parent body comprising: mixing an alumina powder with a jet of air under pressure, directing said mixture of alumina powder and air under pressure at the hot glass body, to substantially surround said body with a cloud of alumina powder, and trimming said hot glass fragments from said hot glass body, while said hot glass body is surrounded by said cloud, whereby said hot glass body will be coated with alumina powder, and any hot glass fragments trimmed from said hot glass body will be coated with said alumina powder as they pass through said cloud of alumina powder prior to the falling on said not glass body.

References Cited

UNITED STATES PATENTS

| 1,857,213 | 5/1932 | Poundstone | 65—24 |
| 2,188,608 | 1/1940 | Littleton et al. | 65—169 |
| 2,486,153 | 10/1949 | Gwyn | 65—24 |
| 3,208,839 | 9/1965 | Nordberg | 65—24 |
| 3,442,748 | 5/1969 | D'Huart | 65—23 XR |

FRANK W. MIGA, Primary Examiner

U.S. Cl. X.R.

65—25, 30, 112, 169, 170